United States Patent [19]

Yoshino et al.

[11] Patent Number: 4,686,169

[45] Date of Patent: Aug. 11, 1987

[54] OPTICAL RECORDING MEDIUM AND PRODUCTION OF THE SAME

[75] Inventors: Kimiaki Yoshino, Yawata; Eiji Ando, Katano; Jinsei Miyazaki, Hirakata; Kazuhisa Morimoto, Settsu, all of Japan

[73] Assignee: Matsushita Electric Industrial Co., Ltd., Osaka, Japan

[21] Appl. No.: 796,445

[22] Filed: Nov. 8, 1985

[30] Foreign Application Priority Data

Nov. 13, 1984 [JP] Japan ................................ 59-239743
Nov. 13, 1984 [JP] Japan ................................ 59-239744
Nov. 28, 1984 [JP] Japan ................................ 59-250834
Jun. 12, 1985 [JP] Japan ................................ 60-127414

[51] Int. Cl.$^4$ .............................................. G03C 1/733
[52] U.S. Cl. .................................... 430/339; 430/338; 430/962; 430/945; 430/935; 430/961
[58] Field of Search ................... 430/338, 19, 962, 21, 430/495, 270, 935, 339, 945

[56] References Cited

U.S. PATENT DOCUMENTS 3,715,212  2/1973  Ross ...................................... 430/21
4,458,004  7/1984  Tanikawa ............................ 430/945
4,539,061  9/1985  Sagiv ................................... 428/420

Primary Examiner—Won H. Louie
Attorney, Agent, or Firm—Wenderoth, Lind & Ponack

[57] ABSTRACT

An optical recording medium comprising a substrate and an information recording layer which consists of monolayer assemblies comprising a photochromic compound of which is based on cis-trans isomerization such as an amphipathic derivative of azobenzene, indigo or thioindigo having a long chain substituent, which monolayers are formed on the substrate by the Langmuir-Blodgett method and oriented in a two-dimensional plain. When the recording medium is irradiated by light, light absorption spectrum of the recording layer changes so that information is recorded. Since the photochromic compound is oriented in a monolayer, its photochromism lasts long.

13 Claims, 4 Drawing Figures

OPTICAL RECORDING MEDIUM AND PRODUCTION OF THE SAME

BACKGROUND OF THE INVENTION

The present invention relates to an optical recording medium for the optical recording and/or reproduction of information through physical and chemical change induced in an information recording layer of the medium, and a method for producing an optical recording medium.

The optical recording medium comprises an information recording layer containing an organic material such as a dye, a dye-polymer complex, a photosensitive polymer, a photosensitive diazo compound and a photochromic dye.

When the dye or dye-polymer complex is used as the information recording layer, it is selectively melt, vaporized or deformed by irradiation of laser light to form irregularity in the layer by which information is recorded. This way of recording is so-called heat mode recording and is based on the same mechanism as applied to a practically used chalcogen semiconductive material.

The organic photochromic dye attracts attention due to its reversibility and is studied as an erasable photone mode recording material (see for example L. M. Ralston, SPIE 420, 186 (1983)). Most of the photochromic dyes are soluble in a solvent and expected to make it possible to produce an optical recording medium such as a disc by forming its thin layer by spin coating. However, they have not been practically used.

When the photochromic dye is irradiated by light having a specific wavelength, its light absorption spectrum changes from one state to another. However, the photochromic dye in which photochromism is based on cis-trans isomerization exhibits photochromism in a solution but not in the form of a solid thin film.

SUMMARY OF THE INVENTION

One object of the present invention is to provide an optical recording medium comprising a substrate and an information recording layer which consists of a photochromic dye of which is based on the cis-trans isomerization and which is stable in both cis and trans forms.

Another object of the present invention is to provide a method for producing an optical recording medium comprising a substrate and an information recording layer which consists of a photochromic dye of which is based on the cis-trans isomerization and which is stable in both cis and trans forms.

According to the present invention, the information recording medium is formed on the substrate by assembly of monolayers of a cis-trans isomerization type photochromic compound preferably having an amphipathic property having hydrophilic and hydrophobic residues in balance or a mixture of a photochromic compound and a monolayer film-forming compound preferably with an amphipathic property which films are oriented in a two-dimensional plane.

When laser light is irradiated on the optical recording medium of the invention, the information recording layer responds to laser light so as to have a light absorption spectrum which is different from one before irradiation and thereby information is recorded in the medium. The irradiated part of the information recording layer does not naturally reverse to the unirradiated original state, so that information does not disappear.

This may be attributed to the fact that the inherent structural steric hindrance of the amphipathic photochromic compound and the caused steric hindrance in the oriented state in the two-dimensional plane can be well balanced so that the photochromism of the compound is maintained and thermal reverse tendency is prevented, this resulting in long life of information recording.

BRIEF DESCRIPTION OF THE INVENTION

FIG. 1 is an enlarged cross section of one embodiment of an optical recording medium according to the present invention, FIG. 2 is an enlarged cross section of another embodiment of an optical recording medium according to the present invention, FIG. 3 is a graph showing change of light absorption of one embodiment of the information recording medium according to the present invention before and after irradiation, and FIG. 4 is a graph showing change of light absorption of another embodiment of the information recording medium according to the present invention before and after irradiation.

DETAILED DESCRIPTION OF THE INVENTION

Figure 1:
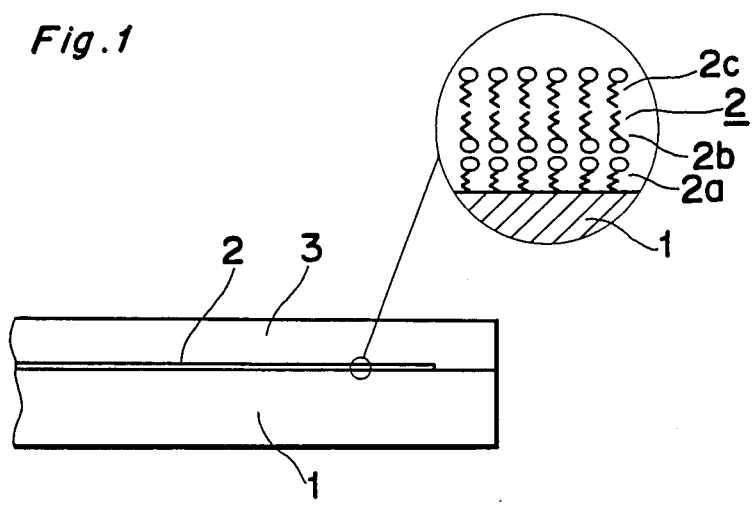

The photochromic compound to be used according to the present invention is an amphipathic compound having an unsaturated double bond which induces cis-trans isomerization of the compound and preferably a compound having a nitrogen-nitrogen double bond (e.g. azobenzene derivatives) and a compound having a carbon-carbon double bond (e.g. indigo derivatives and thioindigo derivatives), which are made amphipathic by the introduction of a hydrophobic group such as an alkyl, alkoxy, alkylacyl or alkylamino group having at least 10 carbon atoms, preferably 14 to 25 carbon atoms. Specific examples of the photochromic compounds are 4-monostearoylaminoazobenzene, N,N'-distearoylindigo, 5-octadecylthioindigo, 5-octadecyl-5'-t-butylthioindigo and 5-octadecyl-1,8-naphthylthioindigo.

Specific examples of the monolayer film-forming compound are fatty acids and their derivatives (e.g. stearic acid, arachidic acid, methyl stearate and stearyl alcohol), tripalmitine, phospholipid, and the like. When the monolayer film-forming compound is used, a molar ratio of the monolayer film-forming compound to the photochromic compound is from 1:1 to 6:1, preferably from 1:1 to 2:1.

According to the present invention, the information recording medium is formed on the substrate by assembling monolayers of the photochromic compound or the mixture of the photochromic compound and the monolayer film-forming compound oriented in a two-dimensional plane by a so-called Langmuir-Blodgett method or a horizontal lifting method. In this method, a solution of the photochromic compound or the mixture of the photochromic compound and the monolayer film-forming compound in a suitable solvent is spread on a surface of distilled water and a metal ion concentration of which are suitably adjusted, namely a subphase, and the surface pressure generated by the spread material after evaporation of the solvent is adjusted by a barrier. When the most suitable surface pressure, namely cumulative pressure is reached, a smooth plate of glass, a metal or a semiconductive material to be used as the substrate is gradually moved onto the surface of the subphase in a direction perpendicular to the surface or in a horizontal direction to contact with the monolayer formed on the subphase. Thus, the monolayer is transferred from the subphase surface to the plate surface. These steps are repeated to form an information recording layer consisting of the predetermined number of the monolayers on the substrate.

pH of the subphase is usually from 4 to 9. Examples of the metal ion are Barium, Calcium and Lead, and its concentration in the subphase is usually from $10^{-3}$ to $10^{-5}$M.

Examples of the spreding solvent in which the photochromic compound or its mixture is dissolved are benzene, chloroform, n-hexane, cyclohexane and ethyl ether. Concentration of the photochromic compound or its mixture is from 0.01 to 10 mg/ml, preferably from 0.1 to 1 mg/ml.

On the information recording medium, a suitable protective layer is formed by a per se conventional method. Generally, the protective layer is made of acrylic resin.

Hereinafter, the present invention will be described by way of examples which are not intended to limit the scope of the present invention, but are only for the purpose of illustration.

EXAMPLE 1

A $1 \times 10^{-3}$M solution of 4-monostearoylaminoazobenzene in benzene was irradiated by light having a wavelength of about 360 nm. 250 μl of the irradiated solution was spread on a surface of a subphase (pH=7) at 18° C. to form a monolayer, which was compressed at a barrier rate of 10 mm/min. When the surface pressure reached to about 20 dyn/cm, a substrate in the form of a disc was moved up and down 15 times in a direction perpendicular to the monolayer to form an information recording layer with a thickness of about 750 Å consisting of 30 monolayers on the substrate as schematically shown in FIG. 1, in which 1 denotes the substrate, and 2 denotes the information recording layer formed thereon. On the recording layer, a protective layer 3 was formed in a subsequent step. The figure in the circle is an enlarged schematic view of the monolayers 2a, 2b and 2c.

The produced optical recording disc was irradiated by light having a wavelength of about 440 nm with a spot size of 1 μm to record information. While the medium absorbed light having a wavelength of about 440 nm before irradiation, it was transparent to said light after irradiation. This means that the optical density of the recording layer 2 was changed by irradiation so that the medium functioned as the optical recording medium.

Photochromism of the produced optical recording medium lasts long and does not naturally reverse to the original state as in the case of a solution.

EXAMPLE 2

Figure 2:
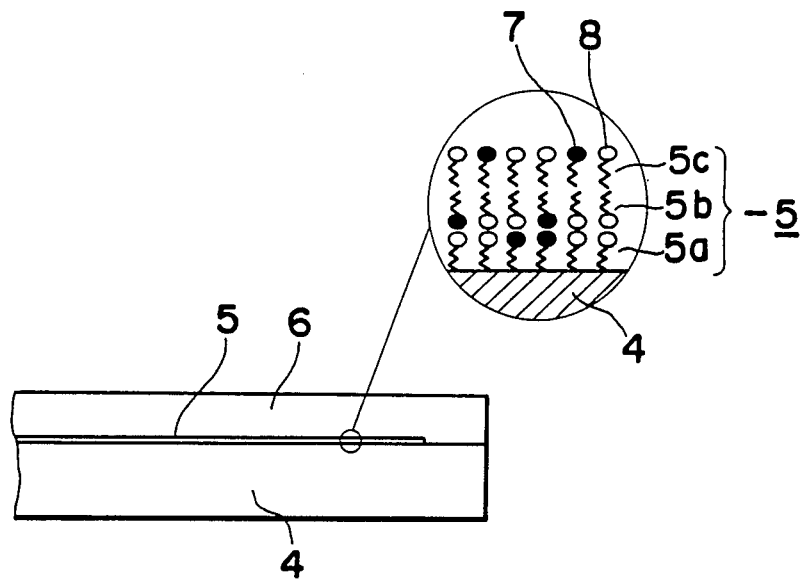

A $1 \times 10^{-3}$M solution of a mixture of 4-monostearoylaminoazobenzene and stearic acid in a molar ratio of 1:2 in benzene was irradiated by light having a wavelength of about 360 nm. 250 μl of the irradiated solution was spread on a surface of a subphase (pH=7) at 18° C. to form a monolayer, which was compressed at a barrier rate of 10 mm/min. When the surface pressure reached to about 20 dyn/cm, a substrate in the form of a disc was moved up and down 15 times in a direction perpendicular to the monolayer to form an information recording layer with a thickness of about 750 Å consisting of 30 monolayers on the substrate as schematically shown in FIG. 2, in which 4 denotes the substrate, and 5 denotes the information recording layer formed thereon. On the recording layer, a protective layer 6 was formed in a subsequent step. The figure in the circle is an enlarged schematic view of the monolayers 5a, 5b and 5c, in which the molecules with black circles 7 correspond to the photochromic compound molecules, and the molecules with white circles 8 correspond to the amphipathic monolayer forming compound molecules.

The thus produced optical recording disc was irradiated by light having a wavelength of about 440 nm with a spot size of 1 μm to record information. While the medium absorbed light having a wavelength of about 440 nm before irradiation, it was transparent to said light after irradiation. This means that the optical density of the recording layer 5 was changed by irradiation so that the medium functioned as the optical recording medium. The information recorded by the produced disc was not changed after 30 days, while information recorded by an optical recording medium utilizing a conventional photochromic compounds disappeared within several hours.

EXAMPLE 3

Stearic acid (25 g) was reacted with thionylchloride (30 g) to form stearoylchloride, which was further reacted with indigo (5.2 g) in pyridine to obtain N,N'-distearoylindigo in per se conventional manners.

A $1 \times 10^{-3}$M solution of N,N'-distearoylindigo in benzene was irradiated by light having a wavelength of about 580 nm. 200 μl of the irradiated solution was spread on a surface of a subphase (pH=5.8) at 18° C. to form a monolayer, which was compressed at a barrier rate of 10 mm/min. When the surface pressure reached to about 25 dyn/cm, a glass substrate in the form of a disc, which had been made hydrophobic with cadmium arachidate, was moved up and down 10 times in a direction perpendicular to the monolayer to form an information recording layer consisting of 20 monolayers on the substrate as schematically shown in FIG. 1, in which 1 denotes the glass substrate, and 2 denotes the information recording layer formed thereon. On the recording layer, a protective layer 3 was formed in a subsequent step. The figure in the circle is an enlarged schematic view of the monolayers 2a, 2b and 2c.

The produced optical recording disc was irradiated by light having a wavelength of about 440 nm with a spot size of 1 μm to record information. While the medium absorbed light having a wavelength of about 440 nm before irradiation, it was transparent to said light after irradiation. This means that the optical density of the recording layer 2 was changed by irradiation so that the medium functioned as the optical recording medium.

EXAMPLE 4

A $1.5 \times 10^{-3}$M solution of a mixture of N,N'-distearoylindigo prepared in the same manner as in Example 3 tripalmitine in a molar ratio of 1:2 in benzene was irradiated by light having a wavelength of about 580 nm. Then, 20 monolayers were formed on a chromium plating substrate which had been made hydrophobic with cadmium arachidate to form a recording layer on the substrate in the same manner as in Example 3.

Figure 3:
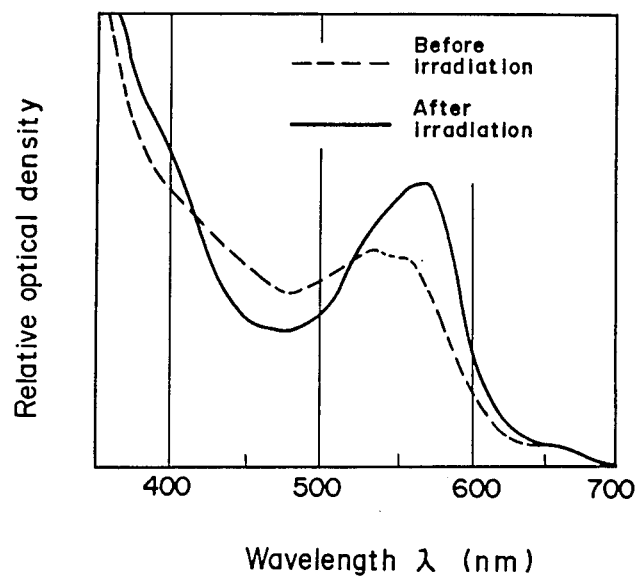

The produced optical recording medium was irradiated by light having a wavelength of about 440 nm with a spot size of 1 μm to record information. While the medium was transparent to light having a wavelength of about 540 nm and intensity of the reflected light was strong before irradiation, its absorption of said light increased after irradiation as shown in FIG. 3. This means that the optical density of the recording layer 2 was changed by irradiation so that the medium functioned as the optical recording medium.

Photochromism of the produced optical recording medium lasts long and does not naturally reverse to the original state as in the case of a solution.

EXAMPLE 5

Octadecylbenzene (330 g) was sulfonated to form octadecylbenzenesulfonic acid, which was acylated and then reduced to obtain p-octadecylbenzenethiol in per se conventional manners. p-Octadecylbenzenethiol (150 g) was further reacted with monochloroacetic acid (75 g) to form thioglycolic acid, which was ring opened to obtained 5-octadecyl-3-oxo-1-thiophene.

A reaction product of 3-oxo-1-thiophene (10 g) and p-nitroso-dimethylaniline (24 g) was condensated with 5-octadecyl-3-oxo-1-thiophene (10 g) to obtain 5-octadecylthioindigo of the formula:

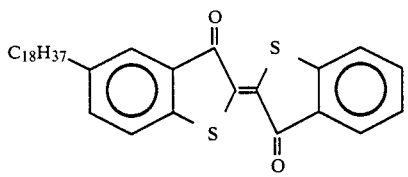

(I)

Figure 4:
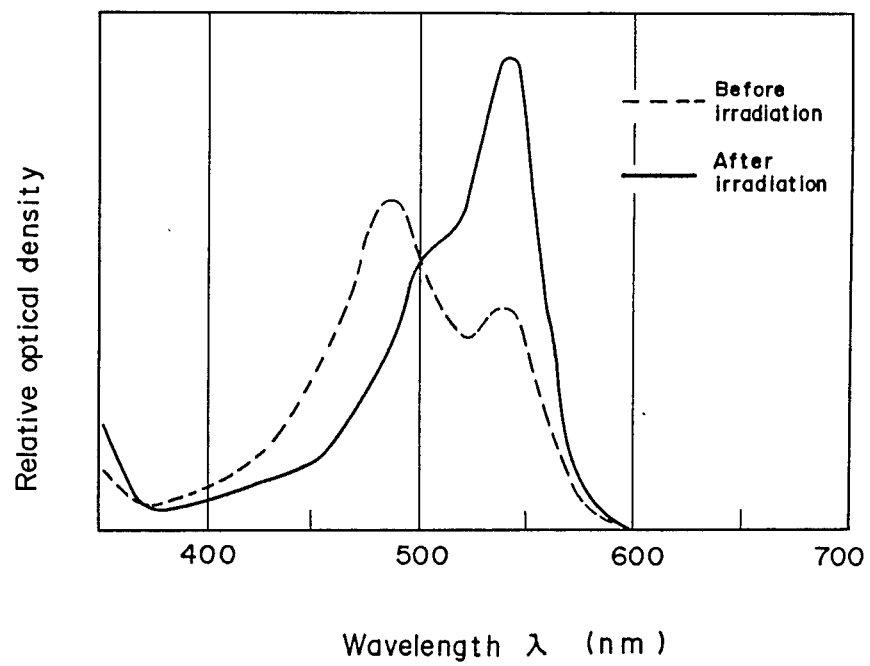

The thioindigo derivative (I) had an absorption spectrum as shown in FIG. 4 by the solid line.

A $1 \times 10^{-3}$M solution of the thioindigo derivative (I) in benzene was irradiated by light having a wavelength of about 560 nm. 300 μl of the irradiated solution was spread on a surface of a subphase (pH=5.2) at 18° C. to form a monolayer, which was compressed at a barrier rate of 10 mm/min. When the surface pressure reached to about 20 dyn/cm, a glass substrate in the form of a disc, which had been made hydrophobic with cadmium arachidate was moved up and down 10 times in a direction perpendicular to the monolayer to form an information recording layer consisting of 20 monolayers on the substrate as schematically shown in FIG. 1, in which 1 denotes the glass substrate, and 2 denotes the information recording layer formed thereon. On the recording layer, a protective layer was formed in a subsequent step. The figure in the circle is an enlarged schemitic view of the monolayers 2a, 2b and 2c.

The produced optical recording disc was irradiated by light having a wavelength of about 560 nm with a spot size of 1 μm to record information. While the medium absorbed light having a wavelength of about 450 nm before irradiation, it was transparent to said light after irradiation. This means that the optical density of the recording layer 2 was changed by irradiation so that the medium functioned as the optical recording medium.

Photochromism of the produced optical recording medium lasts long and does not naturally reverse to the original state as in the case of a solution.

EXAMPLE 6

In the same manner as in Example 5, 5-octadecyl-3-oxo-1-thiophene was prepared. A reaction product of 5-octadecyl-3-oxo-1-thiophene (10 g) and p-nitroso-dimethylaniline (25 g) was condensated with 5-t-butyl-3-oxo-1-thiophene (12 g) to obtain 5-octadecyl-5'-t-butylthioindigo of the formula:

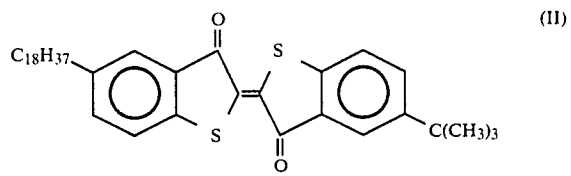

(II)

A $0.5 \times 10^{-3}$M solution of a mixture of the thioindigo derivative (II) and tripalmitine in a molar ratio of 1:2 in chloroform was irradiated by light having a wavelength of about 550 nm. Then, a recording layer consisting of 20 monolayers was formed from the irradiated solution on a chromium plating in the same manner as in Example 5. The plate had been made hydrophobic with cadmium arachidate.

The produced optical recording disc was irradiated by light having a wavelength of about 450 nm with a spot size of 1 μm to record information. While the medium was transparent to light having a wavelength of about 450 nm and intensity of the reflected light was strong before irradiation, its absorbance of said light increased after irradiation and the intensity of the reflected light decreased. This means that the optical density of the recording layer 2 was changed by irradiation so that the medium functioned as the optical recording medium.

Photochromism of the produced optical recording medium lasts long and does not naturally reverse to the original state as in the case of a solution.

EXAMPLE 7

In the same manner as in Example 5, 5-octadecyl-3-oxo-1-thiophene was obtained. A reaction product of 5-octadecyl-3-oxo-1-thiophene (5 g) and p-nitroso-dimethylaniline (15 g) was condensated with 3-oxo-1-naphtho[1.8-b]thiophene (10 g) synthesized form 1,8-naphthalimido (100 g) to obtain 5-octadecyl-1,8-naphthylthioindigo of the formula:

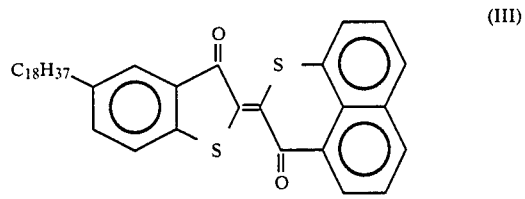

(III)

A $0.5 \times 10^{-3}$M solution of a mixture of the thioindigo derivative (III) and tripalmitine in a molar ratio of 1:2 was irradiated by light having a wavelength of about 600 nm. Then, a recording layer consisting of 30 monolayers was formed from the irradiated solution on a glass substrate in the same manner as in Example 5. The substrate had been made hydrophobic with cadmium arachidate.

The produced optical recording disc was irradiated by light having a wavelength of about 480 nm with a spot size of 1 μm to record information. While the medium absorbed light having wavelength of about 480 nm before irradiation, it was transparent to said light after irradiation. This means that the optical density of the recording layer 2 was changed by irradiation so that the medium functioned as the optical recording medium.

Photochromism of the produced optical recording medium lasts long and does not naturally reverse to the original state as in the case of a solution.

What is claimed is:

1. An optical recording medium comprising a substrate and an information recording layer which consists of monomolecular layer assemblies comprising a photochromic dye which exhibits photochromism based on cis-trans isomerization and is stable in both cis and trans forms, which monomolecular layer assemblies are oriented in a two-dimensional plane.

2. An optical recording medium according to claim 1, wherein the photochromic dye has an amphipathic property.

3. An optical recording medium according to claim 1, wherein the monomolecular assemblies further comprises an amphipathic monomolecular film-forming compound.

4. An optical recording medium according to claim 1, wherein the photochromic compound is an amphipathic azobenzene derivative having a nitrogen-nitrogen double bond.

5. An optical recording medium according to claim 4, wherein the azobenzene derivative has a hydrophobic substituent on its chromophore ring selected from an alkyl group having at least 10 carbon atoms, an alkoxy group having at least 10 carbon atoms, an alkylacyl group having at least 10 carbon atoms and an alkylamino group having at least 10 carbon atoms.

6. An optical recording medium according to claim 5, wherein the azobenzene derivative is 4-monostearoylazobenzene.

7. An optical recording medium according to claim 2, wherein the amphipathic dye is one selected from the group consisting of an indigo derivative and a thioindigo derivative.

8. An optical recording medium according to claim 7, wherein the indigo or thioindigo derivative has a hydrophobic substituent on its chromophore ring selected from an alkyl group having at least 10 carbon atoms, an alkoxy group having at least 10 carbon atoms, an alkylacyl group having at least 10 carbon atoms and an alkylamino group having at least 10 carbon atoms.

9. An optical recording medium according to claim 8, wherein the indigo derivative is N,N'-diacylindigo.

10. An optical recording medium according to claim 9, wherein N,N'-diacylindigo is N,N'-distearoylindigo.

11. An optical recording medium according to claim 8, wherein the thioindigo derivative is 5-octadecylthioindigo.

12. An optical recording medium according to claim 8, wherein the thioindigo derivative is 5-octadecyl-5'-t-butylthioindigo.

13. An optical recording medium according to claim 8, wherein the thioindigo derivative is 5-octadecyl-1,8-naphtylthioindigo.

* * * * *